United States Patent
Thakkar et al.

(10) Patent No.: US 6,317,824 B1
(45) Date of Patent: *Nov. 13, 2001

(54) METHOD AND APPARATUS FOR PERFORMING INTEGER OPERATIONS IN RESPONSE TO A RESULT OF A FLOATING POINT OPERATION

(75) Inventors: Shreekant S. Thakkar, Portland; Wayne H. Scott, Hillsboro; Patrice Roussel, Portland, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,827

(22) Filed: Mar. 27, 1998

(51) Int. Cl.[7] .................................................. G06F 15/00
(52) U.S. Cl. ......................... 712/222; 712/239; 708/495; 708/525
(58) Field of Search ..................................... 712/239, 566, 712/222, 569; 708/212, 495, 525; 340/146.2

(56) References Cited

U.S. PATENT DOCUMENTS

| | | | |
|---|---|---|---|
| 4,896,133 | | 1/1990 | Methvin et al. .................. 340/146.2 |
| 4,972,314 | * | 11/1990 | Getzinger et al. .................... 711/149 |
| 5,073,864 | | 12/1991 | Methvin et al. ..................... 708/212 |
| 5,388,209 | * | 2/1995 | Akagiri ................................ 704/229 |
| 5,469,551 | * | 11/1995 | Sites et al. ........................... 712/239 |
| 5,493,687 | * | 2/1996 | Garg et al. ............................. 712/23 |
| 5,581,778 | * | 12/1996 | Chin et al. ............................. 712/16 |
| 5,701,508 | * | 12/1997 | Glew et al. ............................ 712/23 |
| 5,889,984 | * | 3/1999 | Mills ................................... 712/225 |

OTHER PUBLICATIONS

"Architecture of a Broadband Mediaprocessor", by Craig Hansen, pp. 334–354; Proceedings of COMPCON'96, Session 20: The MircoUnity Mediaprocessor.

"Chap—A SIMD Graphics Proceesor", by Adam Levinthal and Thomas Porter, Computer Graphics Project, Lucasfilm Ltd., pp. 77–82.

(List continued on next page.)

*Primary Examiner*—Thomas Lee
*Assistant Examiner*—Gautam R. Patel
(74) *Attorney, Agent, or Firm*—Blakely, Sokoloff, Taylor & Zafman LLP

(57) ABSTRACT

A method and apparatus for performing a move mask operation. The present invention provides a method and apparatus for performing operations on packed data values of a first size and format and conversion of the results to data of a second size and format by eliminating redundant data. The present invention is useful, for example, when comparisons are performed on floating point data that is typically larger (e.g., 64 bits) than integer data (e.g., 32 bits) and integer operations are preformed based on the result. Because many processors branch based on integer data, the comparison results stored as floating point data must be transferred to an integer register prior to branching. The present invention takes advantage of redundancy of the floating point comparison results to transfer enough data to convey the comparison result to integer registers with a single instruction.

16 Claims, 6 Drawing Sheets

OTHER PUBLICATIONS

"A Proceesor Architecture for 3D Graphics Calculations", by Yulun Wang, Amante Mangaser and Partha Srinivasan, Computer Motion Inc., Goleta, CA 93117, pp. 1–23.

"Parallel Computers for Graphics Applications", by Adam Levinthal, Pat Hanrahan, Mike Paquette and Jim Lawson, Oct. 5, 1987, pp. 193–198 ,Proceedings: Second International Conference on Architecture Support for Programming Languages and Operating Systems (ASPLOS II).

Tri Media, TM 1000 Preliminary Data Book, 1997, Philips Electronics North America Corporation, Preliminary Information, pp. III–XX, pp. A–1 through A–180.

21164 Alpha Microprocessor, Data Sheet, Preliminary, Samsung Electronics, 1997, pp. III–VII, pp. 1, pp. 2–1–2–6, pp. 3–1–3–14, pp. 4–1–4–10, pp. 49–51, pp. 55–59, pp. 63–77.

"Silicon Graphics Introduces Enhanced MIPS Architecture to Lead the Interactive Digital Revolution", Silicon Graphics, Oct. 21, 1996, pp. 1–2.

"Silicon Graphics Introduces Compact MIPS RISC Microprocessor Code for High Performance at a Low Cost", Silicon Graphics, Oct. 21, 1996, pp. 1–2.

"MIPS Extensions for Digital Media", by Earl Killian, Silicon Graphics Computer Systems, pp. 1–10.

MIPS V Instruction Set, MIPS V Specification, Rev. 1.0, pp. B–1 through B–37.

MIPS Digital Media Extension, MDMX, Rev. 1.0, pp. C–1 through C–40.

MIPS Extension for Digital Media with 3D, MIPS Technologies, Inc., Mar. 12, 1997, pp. 1–26.

Microproceesors Precision Architecture, Hewlett Parckard, 18 pages.

The VIS Instruction Set, Sun Microelectronics, pp. 1–2.

The Visual Instruction Set (VIS): On Chip Support for New–Media Processing, Sun Microsystems, pp. 1–7.

Real–Time MPEG2 Decode with the Visual Instruction Set (VIS), pp. 1–8.

Ultra Port Architecture (UPA): The New–Media System Architecture, pp. 1–4.

UltraSPARC Turbocharges Network Operations an . . . , ULTRASPARC, Turbocharges Network Operations and New–Media Computing, pp. 1–5.

The UltraSPARC Processor—Technology White Paper, Sun Microsystems.

Visual Instruction Set (VIS) User's Guide, Version 1.1, Mar. 1997, Sun Microsystem, Cover page, Title page, pp. III–XII, pp. 1–30, pp. 41–127.

* cited by examiner

METHOD AND APPARATUS FOR PERFORMING INTEGER OPERATIONS IN RESPONSE TO A RESULT OF A FLOATING POINT OPERATION

FIELD OF THE INVENTION

The present invention relates to computer systems. More specifically, the present invention relates to performing integer operations based on results of floating point operations.

BACKGROUND OF THE INVENTION

Prior art processors typically perform comparisons of data, including integer data, floating point data and packed data. Such comparison operations are often used when determining whether branching should occur. For example, in a branch if greater than operation, two numbers are compared and a branch is taken if the first number is greater than the second number. Otherwise, the branch is not taken. The most basic comparisons are of two integer numbers.

In some applications, such as three-dimensional graphics, many numbers are compared to determine the "location" of various objects with respect to each other. In such applications, comparisons are performed more efficiently by operating on packed data. Packed data generally refers to the representation of multiple values by a single number. For example, four eight-bit integer numbers may be represented by a single 32-bit number having four eight-bit segments equivalent to the four eight-bit numbers. Thus, the significance given to various bit placements is altered from standard 32-bit values in order to accurately represent a greater number of smaller values. By performing a compare on the 32-bit packed data, four eight-bit integer compares are accomplished with a single compare operation. Similarly, packed data comparisons may be performed on floating point data.

Because many prior art processors branch on integer operations and many applications operate on floating point data, what is needed is an improved method and apparatus for performing branch instructions based on integer instructions in response to results of floating point operations.

SUMMARY OF THE INVENTION

A method and apparatus for performing a move mask operation is described. An operation is performed on floating point data and data is extracted from a result of the operation. The data includes a set of one or more bits where each bit represents multiple redundant bits in the result of the floating point operation. The set of one or more bits is transferred to an integer register and an operation is performed in response to the set of one or more bits.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for performing a move mask operation is described. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid obscuring the present invention.

The present invention provides a method and apparatus for performing operations on packed data values of a first size and conversion of the results stored in the first size to data of a second size by eliminating redundant data The present invention is useful, for example, when operations are performed on floating point data that is typically larger (e.g., 64 bits) than integer data (e.g., 32 bits) and integer operations are performed based on the floating point result. Because many processors branch based on integer data, the comparison results stored as floating point data must be transferred to an integer register prior to branching. The present invention takes advantage of redundancy of the floating point comparison results to transfer enough data to convey the comparison result to integer registers with a single instruction.

Figure 1:
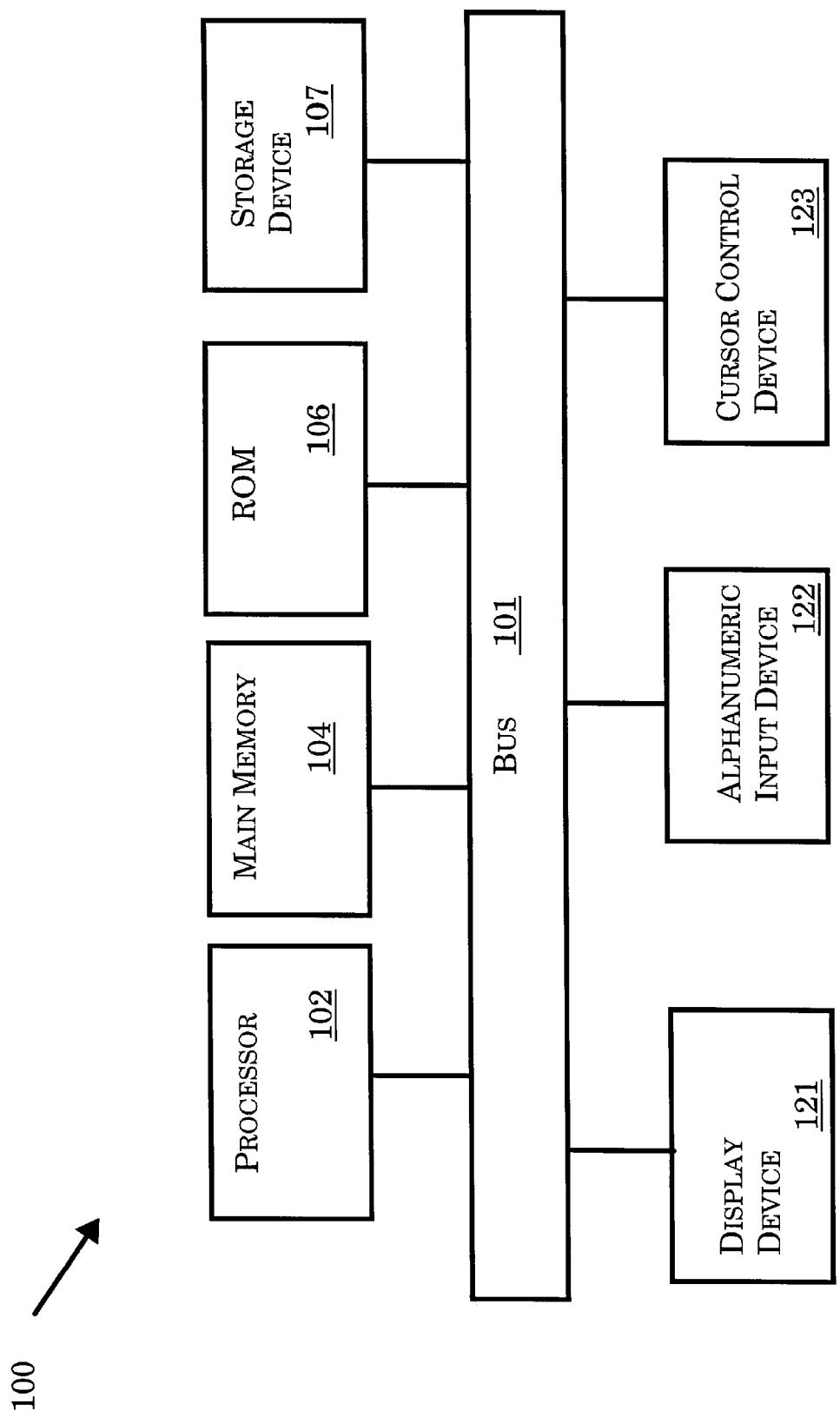
FIG. 1 is one embodiment of a computer system.

FIG. 1 is one embodiment of a computer system. Computer system 100 comprises bus 101 or other device for communicating information, and processor 102 coupled with bus 101 for processing information. Processor 102 may be a complex instruction set computer (CISC) processor, a reduced instruction set computer (RISC) computer, a very long instruction word (VLIW) processor, or any other type of processor. In one embodiment, processor 102 is a processor in the Pentium® family of processors available from Intel Corporation of Santa Clara, Calif. Of course, other processors may also be used. In one embodiment, processor 102 includes one or more register sets for storing integer and/or floating point values.

Computer system 100 further comprises random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises read only memory (ROM) and/or other static storage device 106 coupled to bus 101 for storing static information and instructions for processor 102. Data storage device 107 is coupled to bus 101 for storing information and instructions.

Data storage device 107 such as magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

In one embodiment, computer system 100 provides graphics functionality. Main memory 104 stores sequences of instructions to generate and display graphical or visual displays on display device 121. Processor 102 executes the sequences of instructions to cause display device 121 to display the resulting graphical or video image. The sequences of instructions may respond to user input provided via alphanumeric input device 122, cursor control device 123, or some other input device (not shown in FIG. 1). Of course, other systems may also provide graphics functionality or may use the present invention for purposes other than graphics, such as numerical analysis or other mathematical applications.

Figure 2:
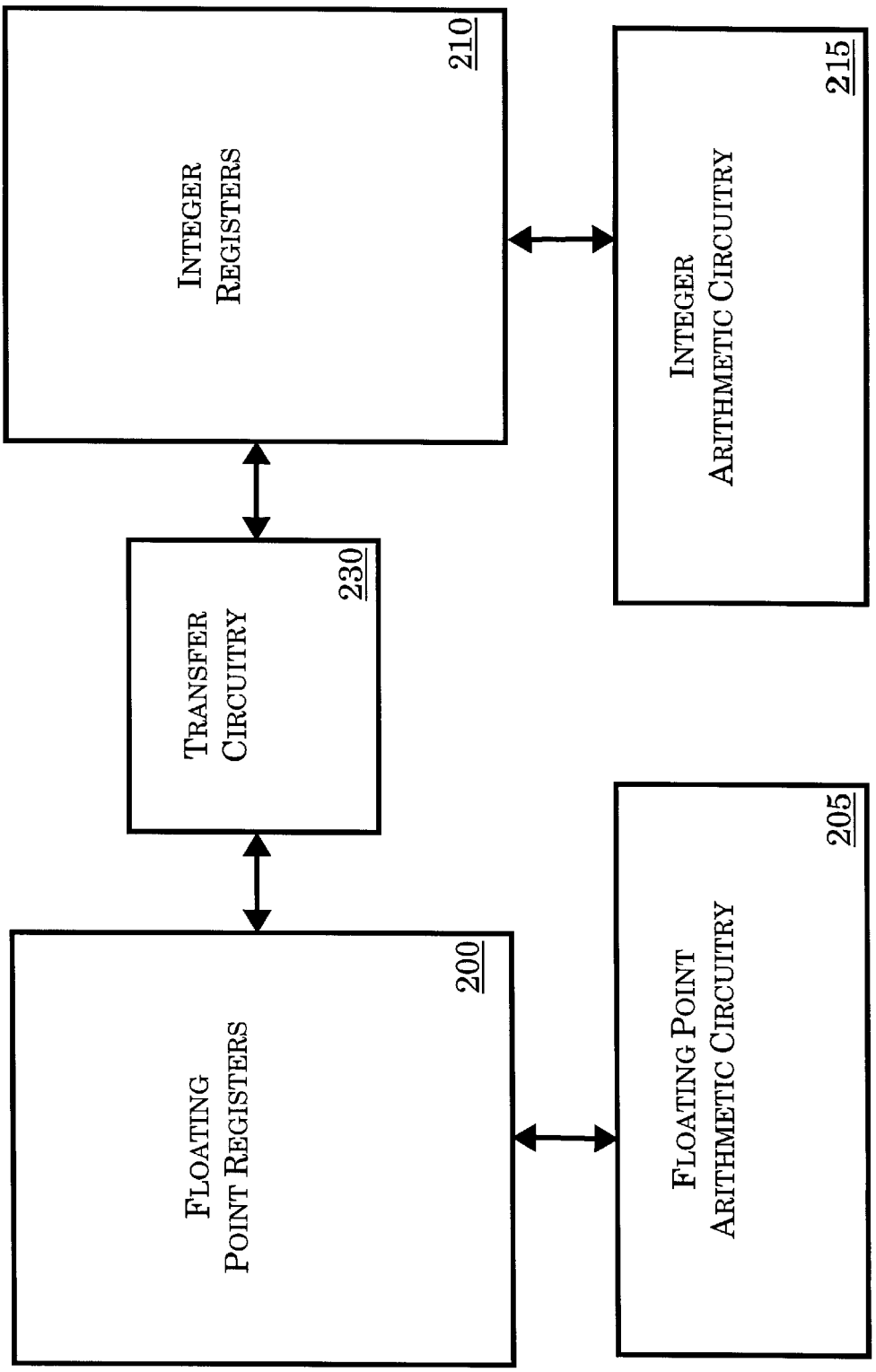
FIG. 2 is one embodiment of an architectural block diagram of a register set and arithmetic circuitry.

FIG. 2 is one embodiment of an architectural block diagram of a register set and arithmetic circuitry. The components of FIG. 2 may be part of processor 102 of FIG. 1, or may be included in other circuitry of computer system 100, either shown or not shown in FIG. 1.

The present invention is described in terms of floating point registers and integer registers. It is important to note that any register architecture may be used with the present invention. Some architectures, for example, provide a predetermined number of integer registers and a predetermined number of floating point registers. Alternatively, an architecture may provide a pool of registers from which registers may be used for either integer or floating point use, such as in a processor that uses a register renaming scheme.

It is also important to note that what is called a register may be multiple registers treated as a single register. For example, a processor may provide multiple 64 bit registers that may be used as integer registers. Within the same architecture, two 64-bit registers may store the upper 64 bits and the lower 64 bits of a floating point number and be treated as a single 128-bit floating point register. Alternative architectures may also be used.

In general, the components of FIG. 2 provide floating point computation and integer computation functionality. Floating point registers 200 store floating point data to be used in operations performed by floating point arithmetic circuitry 205.

Integer registers 210 store integer data in registers for use in operations performed by integer arithmetic circuitry 215. Integer registers 210 are coupled to floating point registers 200 by transfer circuitry 230. Transfer circuitry 230 may be any circuitry that transfers data from floating point registers in floating point format to integer registers stored in integer format.

Figure 3:
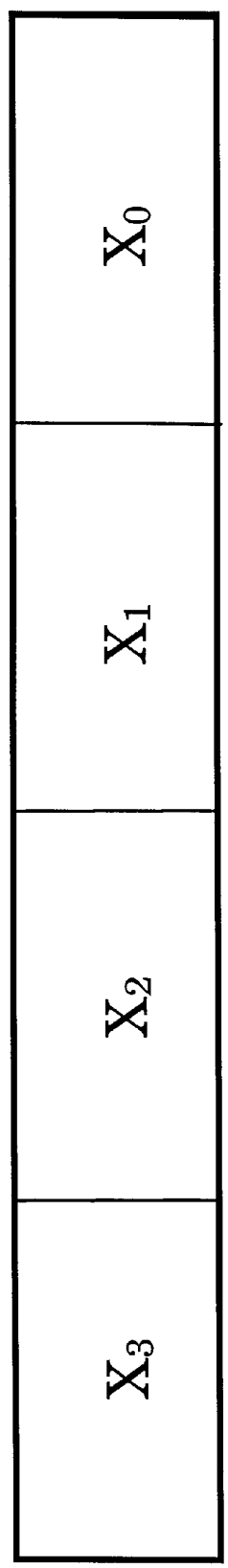
FIG. 3 is one embodiment of a packed data format.

FIG. 3 is one embodiment of a packed data format. The packed data format of FIG. 2 stores four 32-bit numbers ($X_0$, $X_1$, $X_2$, and $X_3$) as a 128-bit packed data value 300. In such an embodiment, bits 0–31 represent $X_0$, bits 32–63 represent $X_1$, bits 64–95 represent $X_2$, and bit 96–127 represent $X_3$. In one embodiment, the packed data are stored in floating point registers.

Packed data operations are performed on two 128-bit packed data values in the format of FIG. 2 with each of the 32-bit values being operated on with the corresponding 32-bit value of the corresponding 128-bit packed data value. For example, to AND two packed data values, bits 0–31 of the two packed data values are ANDed together to result in a 32-bit result value. The other three 32-bit values may be ANDed in parallel to perform four 32-bit AND operations in a single 128-bit operation. Of course, other operations may be performed on packed data, such as additions, subtractions, etc.

Figure 4:
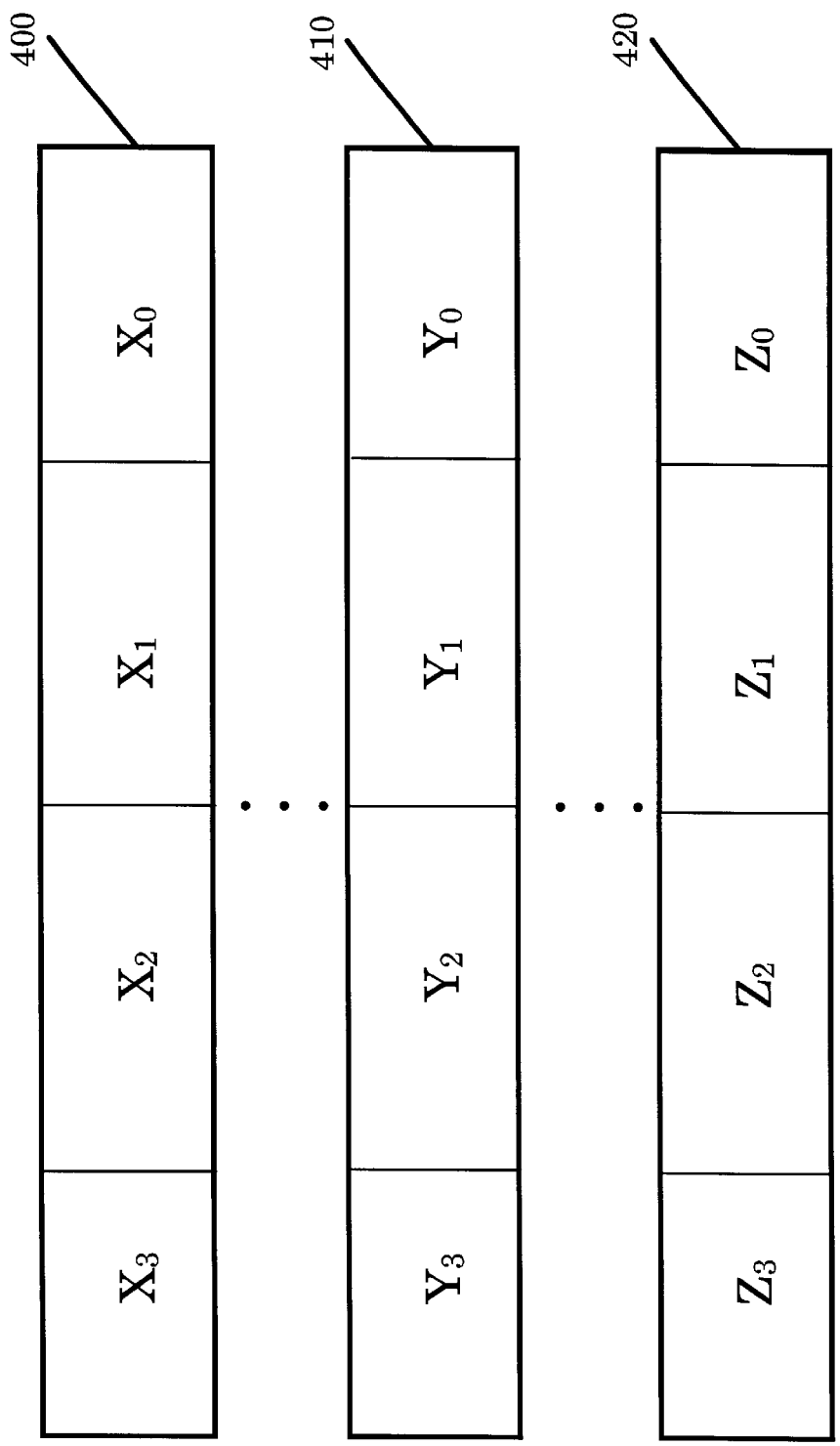
FIG. 4 is one embodiment of the result of a compare operation performed on two packed data values.

FIG. 4 is one embodiment of the result of a compare operation performed on two packed data values in the format described above with respect to FIG. 2. In the example of FIG. 4, 128-bit packed data value 400 is compared to 128-bit packed data value 410. The result is 128-bit packed data value 420.

To perform comparison operation on two 128-bit packed data values, each of the four components of the packed data value are compared to each other. Packed data value 400 comprises four values labeled $X_0$, $X_1$, $X_2$, and $X_3$ and packed data value 410 comprises four values labeled $Y_0$, $Y_1$, $Y_2$, and $Y_3$. Each value in the respective packed data values is compared to a corresponding value in the other packed data value (e.g., $X_3$ and $Y_3$).

Packed data value 420 ($Z_0$, $Z_1$, $Z_2$, and $Z_3$) stores the result of the compare operation. Each value in packed data value 420 stores the result of the compare operation of the corresponding X and Y values. In one embodiment, each value (e.g., $Z_0$, $Z_1$, $Z_2$, and $Z_3$) of packed data value 420 stores either 32 set bits, if the corresponding X value is greater than the Y value, or 32 cleared bits, if the corresponding Y value is greater or equal than the X value. Thus, the result data represented by packed data value stores redundant information. The result information could be stored in four bits, one bit for each of the four 32-bit values stored in the 128-bit result packed data value 420.

In one embodiment, the present invention extracts the most significant bit (MSB), or sign bit from each result value (e.g., $Z_0$, $Z_1$, $Z_2$, and $Z_3$) stored in packed data value 420 when the result of a comparison is transferred to integer registers. Of course, a bit other than the most significant bit could be extracted to convey similar information. In one embodiment, the low four bits or an integer register represent the result of the packed data compare operation.

Figure 5:
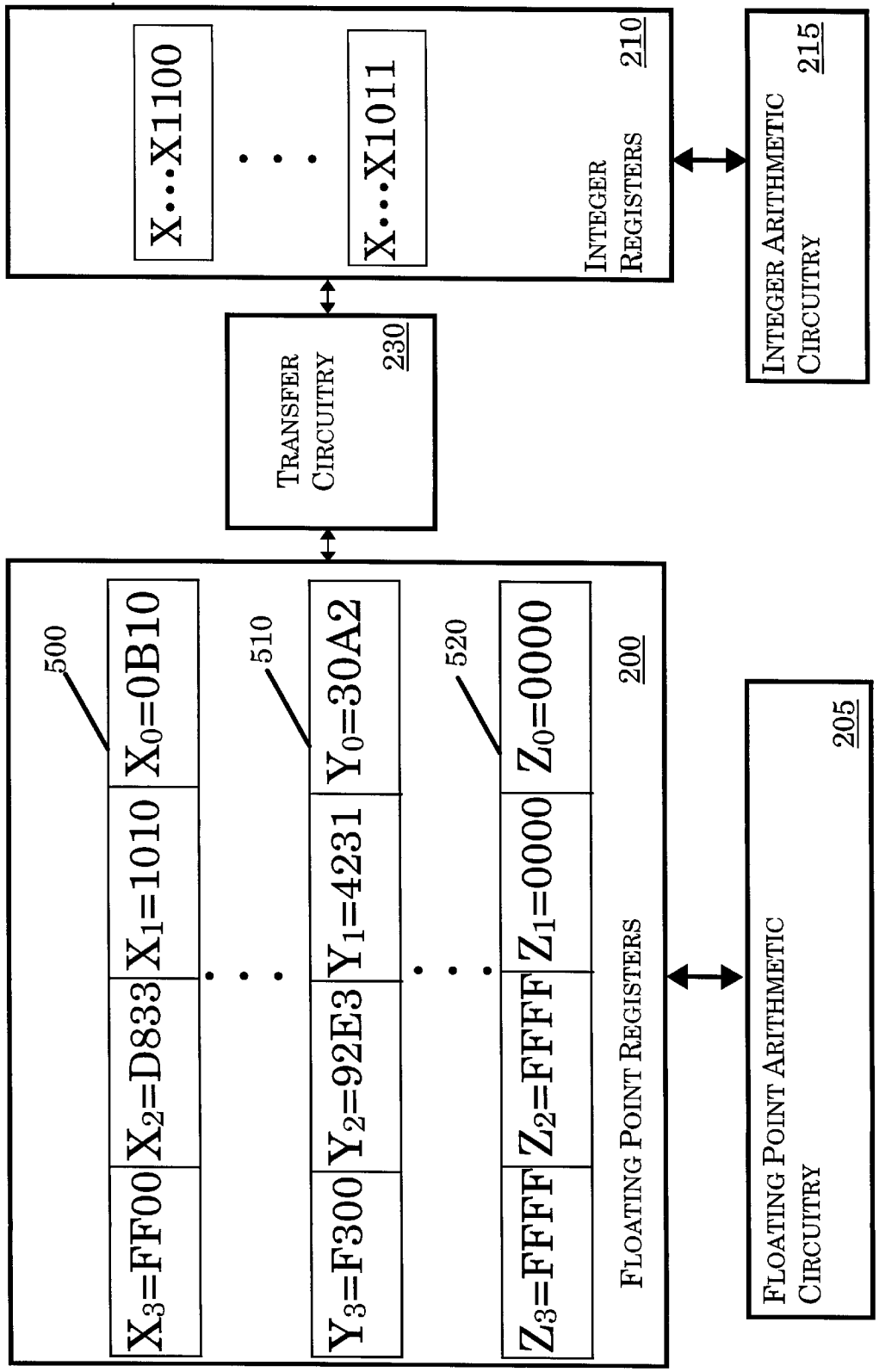
FIG. 5 is one example of compare, move and branch operations.

The example of FIGS. 4 and 5 are described in terms of a compare operation. It is important to note, however, that the floating point operation that provides a result may be any other floating point operation, whether packed or not.

FIG. 5 is one example of compare, move and branch operations. In the example of FIG. 5, two floating point numbers stored in floating point registers are compared. The result is stored in a third floating point register. Selected bits from the result register are transferred to an integer register. The data in the integer register is then used to evaluate a branch condition or perform an integer operation.

The example of FIG. 5 may be useful, for example, when evaluating three-dimensional graphics. Many values may be compared to determine whether two objects overlap, touch, etc. In the following example, four values are compared to four other values as part of a packed data compare operation. Of course, other formats of packed data as well as other floating point operations may also be used. The values stored in floating point registers 200 are described in hexadecimal format, while the values stored in integer registers 210 are described in binary format.

In the following example, packed data value in floating point register 500 is compared to packed data value in floating point register 510. The result is stored as a packed data value in floating point register 520. For example, $X_3$=FF00 and $Y_3$=F300. Thus, $X_3$ is greater than $Y_3$. The result ($Z_3$=FFFF) is stored in packed data value 520. Other values are compared in a similar manner such that the result from each of the four comparisons is stored in register 520. In one embodiment, floating point comparisons are performed by floating point arithmetic circuitry 205.

In one embodiment, the most significant bits from each of the result values (e.g., $Z_0$, $Z_1$, $Z_2$, and $Z_3$) are extracted and transferred, via transfer circuitry 230, to integer register 530.

Thus, the binary value 1100 represents the result of the floating point comparison operation and can be used for integer operations such as branching. In the example of FIG. 5, the binary result value 1100 is compared to a conditional binary value 1011 stored in integer register 540. If the condition is true a branch is taken. Otherwise, the branch is not taken. In one embodiment, integer operations are performed by integer arithmetic circuitry 215.

Performing floating point comparisons in the manner described above is advantageous because the result of the floating point compare is maintained in floating point format and may be used subsequently as a mask for later operations. For example, a logical AND operation my be performed on result packed data value stored in floating point register 520 and the packed data value stored in floating point register 500 to generate a packed data value with the values that are greater than the values of the packed data value stored in floating point register 510 (e.g., $X_3$, $X_2$, 0, 0).

The value stored in floating point register 520 may be logically complemented and then logically ANDed with the value stored in floating point register 510 to generate a packed data value with the values that are greater than the greater values stored in floating point register 500 (e.g., 0, 0, $Y_1$, $Y_0$). The two result values may be logically ORed to generate a packed data value having the values of the respective values stored in floating point registers 500 and 510 (e.g., $X_3$, $X_2$, $Y_1$, $Y_0$).

Another advantage of the present invention is that branches based on floating point comparisons in processors that support integer branching may be performed more efficiently than would otherwise be possible. For example, assuming that the comparison of floating point values, extraction of bits, and transfer of bits to an integer register is performed by a single instruction (e.g., MOVEMASK), the following instruction sequence may be used to perform a branch based on a floating point comparison:

```
Z = MOVEMASK (X,Y)   // compare fp values X and Y, result is int
                     value Z
COMPARE (Z,V)        // compare int values Z and V
JUMP GREATER THAN    // jump if Z > V
```

Thus, the present invention provides a more compact instruction stream, and therefore more efficient code, when multiple comparisons of floating point values are used to determine a branching condition.

The present has been described with respect to compare and branch instructions. However, extraction of bits and transfer to integer registers may be performed with any floating point number. For example, the present invention may be used to extract sign bits from each value of a packed floating point number. The results may be used for integer operations such as branching or comparisons. Thus, the present invention has a broader application than to only floating point comparisons and integer branches.

Figure 6:
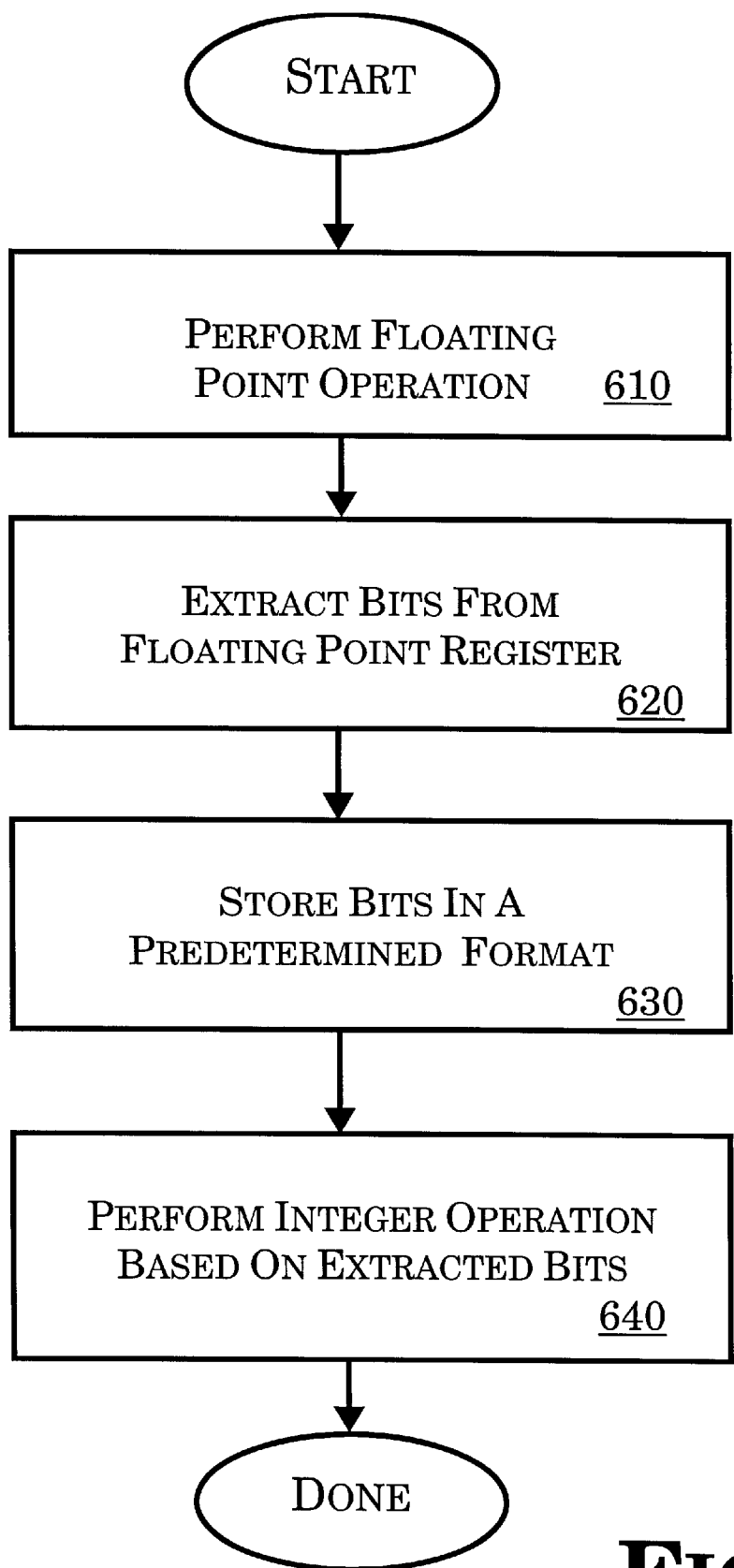
FIG. 6 is one embodiment of a flow diagram for a move mask operation.

FIG. 6 is one embodiment of a flow diagram for performing a move mask instruction. The process of FIG. 6 is performed on floating point values. In one embodiment, the floating point values are packed floating point values. Alternatively, the floating point values are not packed data values.

In step 610, a floating point operation is performed on the floating point values. The floating point operation may be, for example, a packed floating point compare, a packed floating point add, a floating point multiply, etc.

In step 620, one or more bits are extracted from a floating point result register. In one embodiment, the most significant bit of each value of a packed floating point value is extracted. Alternatively, a different bit, such as the least significant bit may be extracted. Extracting the most significant bit provides the advantage that the most significant bit provides the sign of the floating point number. Of course, bits from non-packed data may also be extracted.

The extracted bits are placed in a predetermined format in step 630. In one embodiment, the extracted bits are stored in the least significant bits of the integer format. For example, the bit representing $Z_0$ (shown in FIG. 4) is stored in the least significant bit of the integer format The bit representing $Z_1$ (shown in FIG. 4) is stored in the next to least significant bit of the integer format, and so on. Of course, alternative integer formats may be used. For example, the extracted bits may be stored in the most significant bits of the integer format.

In step 640, an integer operation is performed based on the extracted bits stored in an integer register. For example, a branch on equal may be performed in response to bits extracted from a floating point operation. Of course, other operations, such as integer compare, integer add, etc. may also be performed on the extracted bits.

Thus, the present invention provides a method and apparatus for performing integer operations based on floating point values without losing the floating point value. This leaves the floating point value for later floating point operations, should subsequent operations be performed. The present invention thereby provides more compact code by transferring information to integer registers for integer operations and by maintaining floating point values for possible subsequent floating point operations.

In the foregoing specification, the present invention has been described with reference to specific embodiments thereof It will, however, be evident that various modifications and changes may be made thereto without departing from the broader spirit and scope of the invention. The specification and drawings are, accordingly, to be regarded in an illustrative rather than a restrictive sense.

What is claimed is:

1. In a computer system, a method comprising:
    performing an operation on data stored in a packed floating point format;
    extracting data from a result of the operation, the result stored in the packed floating point format, wherein the extracted data comprises one or more bits representing redundant data for each number represented in the packed floating point result;
    transferring the one or more bits for each number of the packed floating point result a common integer register; and
    determining whether a branching condition is met based on the bits stored in the integer register.

2. The method of claim 1, wherein performing an operation on packed floating point data comprises performing a comparison of two sets of packed floating point data.

3. The method of claim 1, wherein extracting data comprises setting a bit in a result mask register equal to a corresponding most significant bit of each associated packed floating point data value.

4. The method of claim 1, wherein transferring comprises transferring the set of one or more bits from a floating point register to an integer register.

5. A circuit comprising:
    a first set of registers to store data in a packed floating point format;

a first arithmetic unit coupled to the first set of registers to perform a compare operation on data stored in the first set of registers and to store a result as a packed floating point value in one of the first set of registers, the first arithmetic unit further to extract a set of bits from the result, where each bit in the set of bits represents redundant bits in each number represented by the packed floating point format;

a second set of registers to store data in an integer format;

a transfer circuit coupled between the first set of registers and the second set of registers, the transfer circuit to transfer the set of bits to one of the integer registers; and a second arithmetic unit to cause branching operations to be performed based on the set of bits stored in the integer registers.

6. An apparatus comprising:

means for performing an operation on data stored in a packed floating point format;

means for extracting data from a result of the operation, the result stored in the packed floating point format, wherein the extracted data comprises one or more bits representing redundant data for each number represented in the packed floating point result;

means for transferring the one or more bits for each number of the packed floating point result a common integer register; and means for determining whether a branching condition is met based on the bits stored in the integer register.

7. The apparatus of claim 6, wherein the means for performing an operation on packed floating point data comprises means for performing a comparison of two sets of packed floating point data.

8. The apparatus of claim 6, wherein the means for extracting data comprises setting a bit in a result mask register equal to a corresponding most significant bit of each associated packed floating point data value.

9. The apparatus of claim 6, wherein the means for transferring comprises means for transferring the set of one or more bits from a floating point register to an integer register.

10. A graphics display system comprising:

a bus;

a display device coupled to the bus; and a processor coupled to the display device, the processor having a plurality of registers to store packed floating point data and integer data, the processor further comprising circuitry to extract a set of one or more bits of data from one of the registers that stores floating point data and to transfer the extracted bits to an integer register to perform an integer operation, wherein the set of one or more bits comprises at least one bit corresponding to redundant data in each number represented by the packed floating point register, the processor further to cause the display device to change what is displayed in response to the integer operation.

11. The graphics display system of claim 10, wherein the packed floating point data represents a portion of what is displayed by the display device.

12. The graphics display system of claim 10, wherein the processor extracts a most significant bit from each value represented by the packed floating point data.

13. An article comprising a machine-readable medium having stored thereon sequences of instructions that, when executed, cause one or more processors to:

perform an operation on data stored in a packed floating point format;

extract data from a result of the operation, the result stored in the packed floating point format, wherein the extracted data comprises one or more bits representing redundant data for each number represented in the packed floating point result;

transfer the one or more bits for each number of the packed floating point result a common integer register; and determine whether a branching condition is met based on the bits stored in the integer register.

14. The article of claim 13, wherein the sequences of instructions that cause the one or more processors to perform an operation on packed floating point data comprises sequences of instructions that, when executed, cause the one or more processors to perform a comparison of two sets of packed floating point data.

15. The article of claim 13, wherein the sequences of instructions that cause the one or more processors to extract data from a result of the operation stored in the packed floating point format comprises sequences of instructions that, when executed, cause the one or more processors to set a bit in a result mask register equal to a corresponding most significant bit of each associated packed floating point data value.

16. The article of claim 13, wherein the sequences of instructions that cause the one or more processors to transfer the subset of bits to an integer register comprises sequences of instructions that, when executed, cause the one or more processors to transfer the set of one or more bits from a floating point register to an integer register.

* * * * *

UNITED STATES PATENT AND TRADEMARK OFFICE
CERTIFICATE OF CORRECTION

| | | |
|---|---|---|
| PATENT NO. | : 6,317,824 B1 | Page 1 of 1 |
| APPLICATION NO. | : 09/049827 | |
| DATED | : November 13, 2001 | |
| INVENTOR(S) | : Thakkar et al. | |

It is certified that error appears in the above-identified patent and that said Letters Patent is hereby corrected as shown below:

In column 6, at line 51, insert --to-- after "result".

Signed and Sealed this

Twenty-second Day of May, 2007

JON W. DUDAS
*Director of the United States Patent and Trademark Office*